Jan. 30, 1940.　　　A. CLAUD-MANTLE　　　2,188,335
LATCH AND SAFETY CATCH MECHANISM FOR LID TYPE AUTOMOBILE HOODS
Filed Oct. 17, 1938　　　2 Sheets-Sheet 2
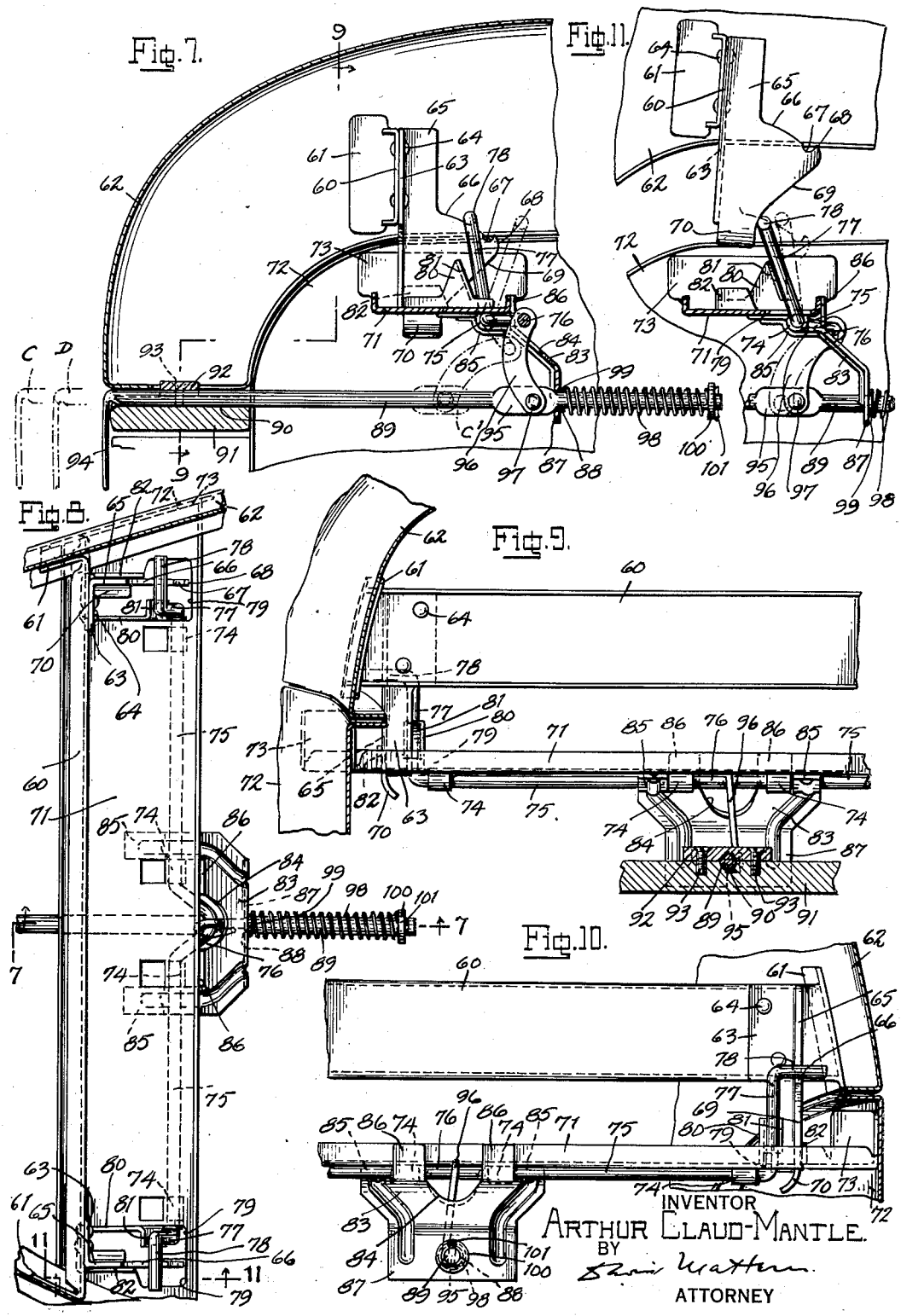
INVENTOR
ARTHUR CLAUD-MANTLE.
BY
ATTORNEY Patented Jan. 30, 1940

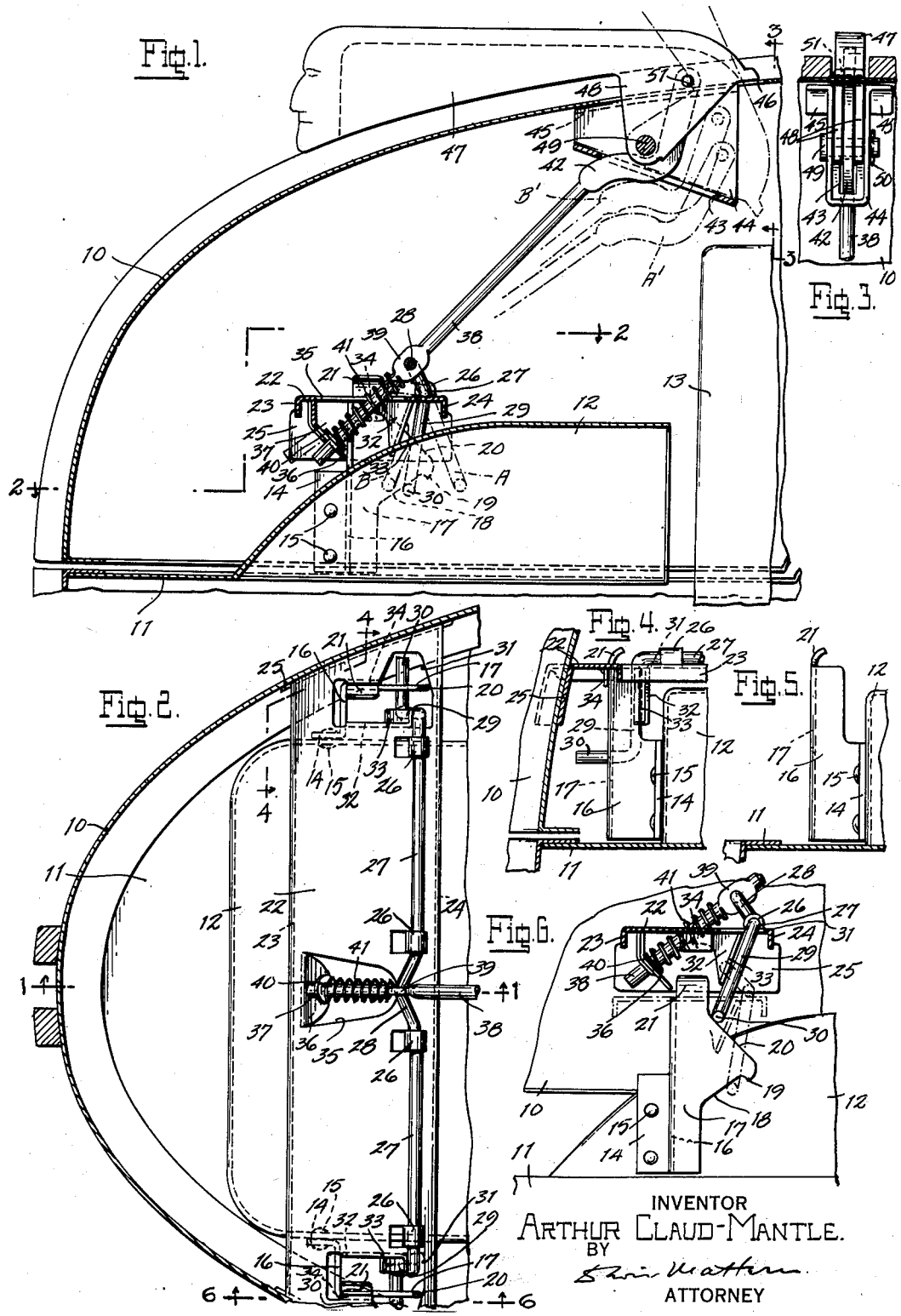

2,188,335

UNITED STATES PATENT OFFICE 2,188,335

LATCH AND SAFETY CATCH MECHANISM FOR LID TYPE AUTOMOBILE HOODS

Arthur Claud-Mantle, Trumbull, Conn., assignor to The Bassick Company, Bridgeport, Conn., a corporation of Connecticut Application October 17, 1938, Serial No. 235,369

9 Claims. (Cl. 292—214)

The present invention relates to an improvement in latch and safety catch mechanism for lid type automobile hoods, particularly of the alligator type which are hinged to the cowl at the rear of the engine compartment, the forward end of the hood adapted to be swung upwardly into open position. Because of the arrangement of the forward swinging end of the hood where relative air currents produced during forward travel of the automobile exert forces which tend to open the hood it is especially desirable that the latch means be at all times so connected in the closed position of the hood that there will be no possibility of the hood accidentally raising, as such accidental and unexpected raising of the hood will obscure the vision of the driver and is very apt to result in serious accident.

It is an object of the present invention to provide a latch mechanism having safety catch means whereby the closed hood is restrained from opening, irrespective of whether or not the latch has been manually placed in its normal latching position.

Another object is to provide a latch mechanism in which resilient means are employed for automatically positioning the cooperating latch parts when the hood is in open position in such relation that such parts will automatically engage when the hood is closed. A further object is to provide a latch mechanism in which the hood means, provided either upon the fixed part of the engine compartment or the movable hood, will function as centralizing means for insuring the proper centralized engagement of the hood in its closed position.

A further object is to provide a remote control actuating means for the latch mechanism arranged so that the latch may be conveniently actuated, and also to provide such means which will lend itself to harmonious incorporation in the streamline design of the automobile structure. Another object is to provide a latch mechanism which will occupy a relatively small space where it will not interfere with the operating parts of the automobile, and further to provide such mechanism which may be efficiently and economically assembled under production methods. A still further object is to provide such mechanism which will form a structural reinforcing part of the automobile structure.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a longitudinal vertical sectional view, showing the forward end of the automobile engine compartment and hood with the latch mechanism in the normal latched position, certain of the dot-and-dash lines showing the position of the latch parts in releasing position, and others showing an intermediate position which is automatically assumed by the latch parts in the open position of the hood. This sectional view is taken along the line 1—1 of Fig. 2.

Fig. 2 is a horizontal sectional plan view, partially broken away, taken along the line 2—2 of Fig. 1.

Fig. 3 is a transverse vertical sectional view, showing the rearward end of the latch actuating means, and taken along the line 3—3 of Fig. 1.

Fig. 4 is a fragmentary transverse vertical sectional view, taken along the line 4—4 of Fig. 1, showing the hook means and cooperating latching means at the right hand side of the hood.

Fig. 5 is a similar view showing the hook means illustrated in Fig. 4, the hood and latching parts carried thereby being removed.

Fig. 6 is a fragmentary vertical sectional view, showing the latch parts in open position of the hood, and showing in dot-and-dash lines the automatic safety catch position, the section being along the line indicated by the line 6—6 of Fig. 2.

Fig. 7 is a vertical longitudinal sectional view of a modified form of latch and safety catch mechanism according to the invention, this section being taken along the line 7—7 of Fig. 8.

Fig. 8 is a horizontal sectional plan view, taken along the line 8—8 of Fig. 7.

Fig. 9 is a fragmentary vertical sectional view taken along the line 9—9 of Fig. 7, the latching parts being shown in front elevation.

Fig. 10 is a similar view to Fig. 9, showing the latching parts in rear elevation.

Fig. 11 is a vertical sectional view showing the latch mechanism in the open relation of the hood, and showing in dot-and-dash lines the safety catch position, this section being taken along the line indicated by the line 11—11 of Fig. 8.

Similar reference characters indicate corresponding parts throughout the several figures of the drawings.

Referring to the drawings, and particularly to Figs. 1 to 6 thereof, the exemplary embodiment of the invention illustrated therein is adapted for incorporation in an automobile structure in which the hood 10 is hinged at its rearward end to the cowl at the rearward end of the engine compartment, the forward end of the hood adapted in its closed position to close in relation to the forward or radiator end 11 of the engine compartment, and in the open position to swing upwardly to expose the top open side of the engine compartment. In the illustrated structure the forward end of the engine compartment is provided with a fixed air baffle plate 12 disposed forwardly of the radiator tank and core structure 13, and the vertically disposed side walls of this air baffle plate are employed for the purpose of mounting the hook members of the latch mechanism, the movable latching parts, and the means for manual actuation of the latching mechanism, being mounted upon the hood.

The vertical side walls of the air baffle plate 12 extend upwardly into the hood in its closed position and are spaced inwardly from the side walls of the hood. Upon each of these side walls and within the space between it and the side wall of the hood there is secured a hook and centralizing member comprising an attaching base portion 14 rigidly secured to the air baffle plate side wall by rivets 15, a bracket portion 16 bent outwardly at a right angle to the base portion 14 and having an upper extension portion projecting above the upper end of the base portion, and a hook and centralizing guide plate portion 17, bent rearwardly at a right angle from the bracket portion 16. This plate portion 17 is provided with an upwardly and rearwardly inclined latch engaging cam surface 18, terminating at its rearward end in a safety catch hook portion 19, the edge of the plate extending upwardly from the hook portion and being inclined forwardly and upwardly, as at 20, to provide a latch engaging guide surface, the plate being provided at the forward end of the surface 20 with an upwardly projecting centralizing guide portion 21, having its upper end curved inwardly with respect to the place of the plate 17 to provide an outwardly and downwardly curved lead surface for guiding the hood into centralizing relation as it is closed, and as will hereinafter more fully appear. It will be understood that the hook and centralizing members at each side of the air baffle plate are identical in form but reversely arranged with respect to each other.

The movable latch parts for cooperating with the hook and centralizing members are mounted upon a horizontal beam member 22 having reinforcing flanges 23 and 24 bent downwardly along its forward and rearward edges and provided at each end with a downwardly bent flange 25, constituting an attaching ear which is shaped to conform to the interior surface of the hood and is secured rigidly thereto by welding, or it may if desired be riveted or screwed into place. It will be observed that the beam member in its secured relation to the hood constitutes a structural reinforcing strut therefor.

A series of bearing loop portions 26 are arranged in axial alignment near the rearward edge of the beam member 22 upon its upper surface, these being preferably lanced from the metal of the beam and bent into cylindrical shape, as shown, and constitute supporting bearings for the spring torsion latch rod 27. Two of the bearing loops are arranged centrally of the beam in spaced relation, and between them the rod 27 is bent into V-form to provide an actuating crank portion 28 for rotating and tensioning the rod. At each end of the rod there is provided a downwardly bent leg portion 29, and a latch portion 30 bent outwardly from the lower end of the leg portion 29, these end portions of the rod each extending downwardly through an opening 31 provided in the beam 22 near each end.

The inner wall of each opening 31 is provided with a downwardly bent flange 32 having an outwardly bent forwardly and downwardly inclined stop flange 33, disposed tangentially to the rod 27 so that the leg portion 29 will engage it in parallel relation in one of the operative positions of the catch, as will hereinafter more fully appear. The outer wall of each opening 31 is provided with a downwardly bent flange 34 with which the centralizing curved end 21 of the hook plate 17 engages during closing of the hood to centralize it, the outer vertical surface of the plate 17 engaging this flange 33 in the centralized position, as shown clearly in Figs. 2 and 4.

Within the central area of the beam member 22, and forwardly of the crank portion 28 of the torsion member 27, there is provided an opening 35 from the forward end of which there is bent downwardly a bracket portion 36 having its lower portion extending at a downwardly and rearwardly inclined angle, and having a slot 37 therein in which is engaged, for up and down swinging movement and longitudinal sliding movement, the forward end of the latch operating rod 38, which rod extends upwardly in a diagonal direction through the opening 35 and is provided in spaced relation to its forward end with an apertured flattened bearing portion 39 engaged by the crank portion 28 of the torsion rod 27. Between the bearing portion 39 and a washer 40, engaged upon the rod and seated against the upper surface of the bracket 36 there is provided a helical spring 41, which is under tension to press the rod 38 rearwardly, and whereby the torsion rod is rotated by the crank portion 28 in clockwise direction, this movement being limited in the raised position of the hood by abutment of the leg portions 29 of the rod with the inclined stop flanges 33 of the beam 22, this being the position shown in full lines in Fig. 6. The rod 38 is provided at its upper rearward end with a flattened angular extension portion 42, which extends through a slot 43 in the inclined base of the latch operating handle supporting bracket 44, this bracket being of U-shape in cross-section and provided with outwardly bent ears 45 which are secured to the under surface of the hood preferably by welding, the space within the bracket being aligned with a slot 46 in the hood. The operating handle 47 is in the form of a hood ornament disposed upon the outer side of the hood, and is provided with a pair of parallel spaced bearing extensions 48 which extend through the hood slot 46 into the bracket 44 where they are pivotally mounted upon a cross pin 49 inserted through holes in the side walls of the bracket and secured by a cotter pin 50. The angular extension portion 42 of the rod 38 is so shaped that it extends about the pivot pin 49 into the space between the ears 48 and is there pivotally connected by a cross-pin 51, the point of connection of the cross-pin 51 being so disposed that in the normal latched position of the latch, as shown in Fig. 1, the axis of the pin 51 is at a point past a center line intersecting the axis of the pin 49 and the axis of the crank portion 28 at its point of connection with the rod 38, it being pointed out that in the latched position of the torsion rod 27 it is under tension and exerts a downward pull upon the actuating rod 38 which maintains the position of the pin 51 over the dead center.

The operation is as follows:

In the normal latched position of the hood, as shown in Fig. 1, the latching end portions 30 of the torsion rod 27 engage the inclined cam surfaces 18 of the latch hook members 17 under tension created by torsion set up in the rod 27, such torsion being set up by exerting turning force on the rod 27 in clockwise direction to cause the crank portion 28 to swing in clockwise direction for a short distance after the further swinging of the leg portions 29 is prevented by their engagement with the cam surfaces 18 to thus twist the rod between its ends. This action is brought about by moving the operating handle 47 from its open to its closed position which moves the actuating rod 38 upwardly and rearwardly imparting clockwise rotation to the rod 27. During this movement the pin 51 is forced over the dead center line extending through the axis of the pivot pin 49 and the point of connection of the crank portion 28 with the rod 38. As soon as the pin 51 moves over the dead center the tensioned torsion rod 27, which exerts downward and forward pull upon the actuating rod 38, swings the handle 47 to its closed over center position where it is maintained through said downward pull exerted on the rod 38. In the closed position of the hood the engagement of the bracket portions 17—17 with the flanges 34—34 of the beam member 22 maintains the hood in rigid centralized relation with respect to the engine compartment.

In order to open the hood the handle 47 is swung upwardly to position shown by the dot-and-dash lines A¹ in Fig. 1, it being necessary during the initial swinging movement of the handle to overcome the downward pull exerted on the rod 38 to the point where the pivot pin 51 moves over the dead center, whereupon the handle and the latch parts may be moved to the open position indicated by the dot-and-dash lines A in Fig. 1 simply by overcoming the relatively light pressure of the spring 41. In this relation the latching end portions 30 of the rod 27 are free of the bracket portions 17 and the hood may be raised to open position, the raised handle 47 being conveniently employed for this purpose.

As soon as the handle 47 is released the spring 41, which exerts a constant upward pressure upon the rod 38, moves the latching parts and the rod to the position indicated by dot-and-dash lines B and B¹ in Fig. 1, this also being the position shown in full lines in Fig. 6. The latching end portions 30 of the rod 27 are therefore in position to engage the upper inclined guide surfaces 20 of the hook plate 17 when the hood is moved to closed position.

As the hood moves into its closed position, either by gravity or by manual force exerted thereon, the inclined surfaces 20 cause the latching parts to move against the force of the spring 41 so that the catch portions 30 move over the hook ends 19 of the hook plate 17 and engage the cam surface 18 forwardly of said hood ends, and in which position they are retained under the force of the spring 41. This is the safety catch position, as indicated by the dot-and-dash lines in Fig. 6, and should the operator fail to actuate the catch to its normal latching position the hood will be prevented from accidental opening by engagement of the latching end portions 30 with the hook end 19 the spring 41 holding the ends 30 against the cam surfaces 18 as the hood starts to open.

During closing movement of the hood it will be observed that the curved ends 21 of the hook plate portions 17 guide the hood into centralized closed relation through engagement with the flanges 34. With the latch parts in the safety catch position shown by the dot-and-dash lines in Fig. 6 the latch is actuated to its normal latched position by moving the handle 47 from the safety catch position indicated by the dot-and-dash lines B¹ in Fig. 1 to the full line position, forcing the pivot 51 over the dead center the rod 38 being moved upwardly and rearwardly to set up torsion in the rod 27, and the torsion so set up exerting downward force upon the rod 38 to maintain the pivot pin 51 in its over center latching position, and the handle 47 in its closed position.

In Figs. 7 to 11 I have illustrated a modified form of the invention, in which the cooperating parts are substantially similar in structure and operation to those of the first embodiment, except that they are reversed, that is, the hook and centralizing members are carried upon the hood and the movable latching parts and the actuating means therefor are carried upon the fixed engine compartment. This arrangement is desirable where the design calls for the actuating handle of the catch being at the front of the engine compartment, as distinguished from the first embodiment where the design calls for the actuating handle being in the form of an ornament of the hood.

A vertically disposed transverse channel beam member 60 for supporting the hook and centralizing members is provided at its ends with attaching flanges 61 which are welded or otherwise suitably secured to the side surfaces of the hood 62. Upon the end portions of the beam and in inwardly spaced relation to the side surfaces of the hood there are secured, hook and centralizing members, substantially like those shown in the first embodiment, and each comprising a vertically disposed attaching base portion 63 secured by rivets 64 to the beam and a rearwardly projecting plate portion 65, bent at a right angle to the base portion, this plate portion 65 being provided intermediate its upper and lower ends with a rearwardly and downwardly curved cam surface 66 terminating at its rearward end in a safety catch pocket 67 having a retaining hook portion 68 forming the rear wall of said pocket, the rearward edge of the plate being curved downwardly and forwardly from the hook portion 68 and extending into a forwardly and downwardly inclined guide surface 69, the plate being provided at the forward end of this guide surface 69 with a downwardly projecting hood centralizing guide portion 70, which is curved inwardly to provide a lead surface for guiding the hood into centralized relation with the engine compartment, as will hereinafter more fully appear.

A horizontally disposed transverse channel beam member 71 for carrying the latching parts, extends between the side walls 72 of the engine compartment and is provided at its ends with attaching flanges 73 secured to said side walls preferably by welding. A series of axially aligned bearing loop portions 74 are provided along the under surface of the beam member 71 near its rearward edge, these loop portions being preferably lanced and bent from the metal of the beam member. A torsion rod 75 has bearing in these bearing loop portions and is provided at its central portion between the two centrally disposed bearing loop portions 74 with a V-shape crank portion 75, and at its ends with upwardly extending leg portions 77 and outwardly bent latching end portions 78, the leg portions being extended upwardly through openings 79 provided near the ends of the beam member 71.

The inner wall of each of these openings 79 is provided with an upwardly extending flange 80 provided with an upwardly and forwardly inclined stop flange 81, which is tangential to the rod 75 and is adapted to be engaged by the leg portion 69 of the rod in the raised position of the hood, and as shown in full lines in Fig. 11. The outer wall of each of the openings 79 is provided with an upwardly bent guide flange 82 adapted to be engaged by the centralizing portion 70 of the hook member as the hood is closed and to engage the vertical side surface of the hook member in the closed position of the hood to centralize it.

The bracket for the actuating rod is secured to the central portion of the beam in contiguous relation to the crank portion 76 of the rod 75, and comprises a downwardly and rearwardly inclined portion 83 having an opening 84 therein in which the crank portion 76 is adapted to move, and provided with forwardly extending attaching portions 85 at each side which are shaped to embrace the rod 75 and which are secured preferably by welding to the under side of the beam 73, and being also provided with upwardly extending attaching ears 86 which are secured preferably by welding to the rearward flange of the beam member. The portion 83 terminates in a vertically disposed downwardly extending portion 87 having a bearing aperture 88 therein and in which is guided the rearward end portion of the horizontally disposed actuating rod 89.

The forward end of the rod 89 has sliding bearing in a groove 90 provided in the upper surface of the forward wall 91 of the engine compartment, being retained by a grooved retaining plate 92 secured to the wall by screws 93. A downwardly bent handle portion 94 is provided upon the rod which in the normal latched position seats in substantially flush relation against the forward surface of the wall 91 this handle adapted to be pulled forwardly to actuate the latch to release the hood, as will presently more fully appear. The rod 89 is provided adjacent and forwardly of the bearing portion 87 of the bracket 83 with an apertured flat portion 95 to which a curved link member 96 is secured at its lower end by a pivot pin 97, its upper apertured end being engaged by the crank portion 76 of the torsion rod 75. A helical spring 98 is engaged upon the rearwardly projecting end of the actuating rod 89 between a washer 99 slidably engaging the rod rearwardly of the bearing portion 87 and a washer 100 retained upon the end of the rod by means of a cotter pin 101. This spring exerts a constant rearward pull upon the rod 89 and is substantially similar in its action thereon to the action of the spring 41 upon the rod 38 of the first embodiment.

The operation is as follows:

In the closed position indicated in full lines in Fig. 7 the crank portion 76 of the rod 75 is rotated in counter-clockwise direction with respect to the leg portions 77 to set up torsion in the rod and the pivot pin 97 of the link 96 is at a point rearwardly of the dead center where it is yieldably maintained by the torsion in the rod 75. In order to disengage the catch the rod 89 is pulled forwardly to the position indicated by the dot-and-dash lines C and $C^1$ in Fig. 7 it being necessary during the initial movement to overcome the torsion of the rod 75 to the point where the pivot pin 97 moves forwardly of the dead center, whereupon the rod 89 may be pulled to its forward releasing position against the force of the spring 98. The latching end portions 78 are now out of engagement with the hook members 65 and the hood may be raised. As soon as the rod 89 is released the spring 98 returns the latch parts to the position indicated in full lines in Fig. 11 with the leg portions 77 of the rod 75 seated against the stop flanges 81. The handle end of the rod 89 is in the position indicated by the dot-and-dash lines D in Fig. 1. In this position the latching end portions 78 are in the closing path of the inclined guide surfaces 69 of the hook members, so that in closing the hood, as shown in full lines in Fig. 11, the rod 75 will be rotated in clockwise direction against the force of the spring 98 to the point where the latching ends 78 move over the hook ends 68 the spring 98 then moving the rod 75 in counter-clockwise direction to engage the catch end 78 with the inclined surface 66, as shown in dot-and-dash lines in Fig. 11. This is the safety catch position and in the event that a lifting force is accidentally applied to the hood the engagement of the catch end 78 with the notches 67 and hook portions 68 will prevent accidental opening of the hood. With the parts in the position, as shown in dot-and-dash lines in Fig. 11 the latch is adapted to be actuated to its latching position by pressing the rod 89 inwardly to the full line position shown in Fig. 7 setting up torsion in the rod 75 and moving the pivot pin 97 of the link 96 to its over center latching position.

I have illustrated and described preferred and satisfactory embodiments of the invention, but it will be understood that changes may be made therein, within the spirit and scope thereof, as defined in the appended claims.

Having thus described my invention what I claim and desire to secure by Letters Patent is:

1. In a latching mechanism for releasably securing a lid type automobile hood member or the like to an engine compartment member or the like, in which a fixed latching part is carried by one of said members, movable latching means adapted to be carried by the other of said members for cooperation with said fixed latching part, said latching means comprising a support, a latching member movably mounted on said support and movable between latching and unlatching positions, manually operable actuating means connected to said latching member adapted to be actuated between full latching and unlatching positions to impart latching and unlatching movement to said latching member, means arranged to exert pressure on said actuating means to move it toward its latching position to a predetermined latching point short of its full latching position.

2. In a latching mechanism for releasably securing a lid type automobile hood member or the like to an engine compartment member or the like, in which a fixed latching part is carried by one of said members, movable latching means adapted to be carried by the other of said members for cooperation with said fixed latching part, said latching means comprising a support, a latching member movably mounted on said support and movable between latching and unlatching positions, manually operable actuating means connected to said latching member adapted to be actuated between full latching and unlatching positions to impart latching and unlatching movement to said latching member, means arranged to exert pressure on said actuating means to move it toward its latching position to a predetermined latching point short of its full latching position, and spring means arranged to releasably retain said actuating means in its full latching position.

3. In a latching mechanism for releasably securing a lid type automobile hood member or the like to an engine compartment member or the like, in which a fixed latching part is carried by one of said members, movable latching means adapted to be carried by the other of said members for cooperation with said fixed latching part, said latching means comprising a support, a latching member movably mounted on said support and movable between latching and unlatching positions, manually operable actuating means connected to said latching member adapted to be actuated between full latching and unlatching positions to impart latching and unlatching movement to said latching member, spring means arranged to exert pressure on said actuating means to move it toward its latching position to a predetermined latching point short of its full latching position, and spring means arranged to releasably retain said actuating means in its full latching position, said actuating means including a pivoted part movable between full latching and unlatching positions, the pivot axis in the full latching position being an over center point with respect to the force line of said last mentioned spring means.

4. In a latching mechanism for releasably securing a lid type automobile hood member or the like to an engine compartment member or the like, in which a fixed latching part is carried by said engine compartment member, movable latching means adapted to be carried by said hood member for cooperation with said fixed latching part, said latching means comprising a support, a latching member movably mounted on said support and movable between latching and unlatching positions, manually operable actuating means connected to said latching member comprising a pull rod and a handle member adapted to be mounted exteriorly of the hood as a hood ornament and pivotally connected to said pull rod, said handle member and pull rod adapted to be actuated between full latching and unlatching positions to impart latching and unlatching movement to said latching member, and spring means arranged to releasably retain said actuating means in its full latching position, the pivot of said handle member in the full latching position being at an over-center point with respect to the force line of said spring means.

5. In a latching mechanism for releasably securing a lid type automobile hood member or the like to an engine compartment member or the like, in which a fixed latching part is carried by said engine compartment member, movable latching means adapted to be carried by said hood member for cooperation with said fixed latching part, said latching means comprising a support, a latching member movably mounted on said support and movable between latching and unlatching positions, manually operable actuating means connected to said latching member comprising a pull rod and a handle member adapted to be mounted exteriorly of the hood as a hood ornament and pivotally connected to said pull rod, said handle member and pull rod adapted to be actuated between full latching and unlatching positions to impart latching and unlatching movement to said latching member, spring means arranged to exert pressure on said actuating means to move it toward its latching position to a predetermined latching point short of its full latching position, and spring means arranged to releasably retain said actuating means in its full latching position, the pivot of said handle member in the full latching position being at an over-center point with respect to the force line of said last mentioned spring means.

6. In a latching mechanism for releasably securing a lid type automobile hood member or the like to an engine compartment member or the like, in which a fixed latching part is carried by said hood member, movable latching means adapted to be carried by said engine compartment member for cooperation with said fixed latching part, said latching means comprising a support, a latching member movably mounted on said support and movable between latching and unlatching positions, manually operable actuating means connected to said latching member comprising a reciprocating handle rod adapted to be slidably mounted with respect to said engine compartment member, and a link pivotally connected between said rod and said latching member, said rod and link adapted to be actuated between full latching and unlatching positions to impart latching and unlatching movement to said latching member, and spring means arranged to releasably retain said actuating means its full latching position, the pivot of said link member in the full latching position being at an over-center point with respect to the force line of said spring means.

7. In a latching mechanism for releasably securing a lid type automobile hood member or the like to an engine compartment member or the like, in which a fixed latching part is carried by said hood member, movable latching means adapted to be carried by said engine compartment member for cooperation with said fixed latching part, said latching means comprising a support, a latching member movably mounted on said support and movable between latching and unlatching positions, manually operable actuating means connected to said latching member comprising a reciprocating handle rod adapted to be slidably mounted with respect to said engine compartment member, and a link pivotally connected between said rod and said latching member, said rod and link adapted to be actuated between full latching and unlatching positions to impart latching and unlatching movement to said latching member, spring means arranged to exert pressure on said actuating means to move it toward its latching position to a predetermined latching point short of its full latching position, and spring means arranged to releasably retain said actuating means in its full latching position, the pivot of said link member in the full latching position being at an over-center point with respect to the force line of said last mentioned spring means.

8. In a latching mechanism for releasably securing a lid type automobile hood member or the like to an engine compartment member or the like, in which a fixed latching part is carried by one of said members, movable latching means adapted to be carried by the other of said members for cooperation with said fixed latching part, said latching means comprising a support, a latching torsion rod rotatably mounted on said support for rotation about a longitudinal axis and movable between latching and unlatching positions and including a radially extending crank portion and a radially extending latching portion, relative turning movement between said crank and latching portions adapted to set up spring torsion in said rod, manually operable actuating means connected to said crank portion adapted to be actuated between full latching and unlatching positions to impart latching and unlatching movement to said torsion rod, spring means arranged to exert pressure on said actuating means to move it toward its latching position to a predetermined latching point short of its full latching position.

9. In a latching mechanism for releasably securing a lid type automobile hood member or the like to an engine compartment member or the like, in which a fixed latching part is carried by one of said members, movable latching means adapted to be carried by the other of said members for cooperation with said fixed latching part, said latching means comprising a support, a latching torsion rod rotatably mounted on said support for rotation about a longitudinal axis and movable between latching and unlatching positions and including a radially extending crank portion and a radially extending latching portion, relative turning movement between said crank and latching portions adapted to set up spring torsion in said rod, manually operable actuating means connected to said crank portion adapted to be actuate between full latching and unlatching positions to impart latching and unlatching movement to said torsion rod, spring means arranged to exert pressure on said actuating means to move it toward its latching position to a predetermined latching point short of its full latching position, stop means on said support adapted to be engaged by said torsion rod under the force of said spring means to limit its movement in latching direction.

ARTHUR CLAUD-MANTLE.